US012570404B2

(12) United States Patent     (10) Patent No.: US 12,570,404 B2

Lebeault et al.     (45) Date of Patent: Mar. 10, 2026

(54) PROPULSION ASSEMBLY FOR AN AIRCRAFT COMPRISING A STATOR VANE INTEGRATED INTO AN UPSTREAM PART OF A MOUNTING PYLON OF REDUCED HEIGHT

(71) Applicant: SAFRAN AIRCRAFT ENGINES, Paris (FR)

(72) Inventors: Eva Julie Lebeault, Moissy-Cramayel (FR); Anthony Binder, Moissy-Cramayel (FR); Laurent Soulat, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 19 days.

(21) Appl. No.: 18/261,124

(22) PCT Filed: Jan. 5, 2022

(86) PCT No.: PCT/FR2022/050026

§ 371 (c)(1),
(2) Date: Oct. 10, 2023

(87) PCT Pub. No.: WO2022/152994

PCT Pub. Date: Jul. 21, 2022

(65) Prior Publication Data

US 2024/0116644 A1    Apr. 11, 2024

(30) Foreign Application Priority Data

Jan. 12, 2021   (FR) ...................................... 2100258

(51) Int. Cl.
B64D 27/40 (2024.01)
B64C 7/02 (2006.01)
(Continued)

(52) U.S. Cl.
CPC ................ B64D 27/40 (2024.01); B64C 7/02 (2013.01); B64D 27/402 (2024.01);
(Continued)

(58) Field of Classification Search
CPC .... B64D 27/40; B64D 27/402; B64D 27/404; B64D 27/406; B64D 27/12; B64C 7/02;
(Continued)

(56) References Cited

U.S. PATENT DOCUMENTS

2009/0108127 A1*   4/2009   Cazals ................... B64D 27/40
                  244/54
2010/0080697 A1*   4/2010   Wojno ................... F01D 9/041
                  415/208.2
(Continued)

FOREIGN PATENT DOCUMENTS

EP     2628919 A2    8/2013
FR     2707249 A1    1/1995
FR     3090033 A1    6/2020

OTHER PUBLICATIONS

International Search Report for issued in Application No. PCT/FR2022/050026 dated Apr. 13, 2022.
Written Opinion for PCT/FR2022/050026 dated Apr. 13, 2022.

*Primary Examiner* — Phutthiwat Wongwian
*Assistant Examiner* — Rene D Ford
(74) *Attorney, Agent, or Firm* — McDonald Hopkins LLC

(57) ABSTRACT

A propulsion assembly for an aircraft comprising a dual-flow turbine engine equipped with a fan, an aerodynamic outer shroud acting as a nacelle as well as a mounting pylon, the propulsion assembly having a secondary flow path defined by an outer radial defining surface formed by the shroud, the turbine engine including stator vanes, and the mounting pylon comprising a part housed in the secondary flow path, referred to as upstream part. According to the invention, the upstream part of the pylon extends radially (Continued)

from the inner radial defining surface, along a radial pylon height strictly less than a total radial height of the secondary flow path, and the upstream part of the pylon extends in the downstream direction from a root part of one of the stator vanes.

10 Claims, 8 Drawing Sheets

(51) Int. Cl.

| | |
|---|---|
| *F02C 7/20* | (2006.01) |
| *F02K 1/66* | (2006.01) |
| *F02K 3/068* | (2006.01) |
| *B64D 27/12* | (2006.01) |
| *F02K 1/64* | (2006.01) |

(52) U.S. Cl.

CPC ......... *B64D 27/404* (2024.01); *B64D 27/406* (2024.01); *F02C 7/20* (2013.01); *F02K 1/66* (2013.01); *F02K 3/068* (2013.01); *B64D 27/12* (2013.01); *F02K 1/64* (2013.01); *F05D 2240/122* (2013.01)

(58) Field of Classification Search

CPC ... F02C 7/20; F02K 1/66; F02K 3/068; F05D 2240/122

See application file for complete search history.

(56) References Cited

U.S. PATENT DOCUMENTS

| | | | |
|---|---|---|---|
| 2013/0216364 A1* | 8/2013 | Evans | F02C 7/04 |
| | | | 415/182.1 |
| 2015/0345404 A1 | 12/2015 | Adams et al. | |
| 2020/0002014 A1* | 1/2020 | Vassberg | F02K 3/068 |

* cited by examiner

PROPULSION ASSEMBLY FOR AN AIRCRAFT COMPRISING A STATOR VANE INTEGRATED INTO AN UPSTREAM PART OF A MOUNTING PYLON OF REDUCED HEIGHT

CROSS-REFERENCE TO RELATED APPLICATIONS

This is a National Stage application of PCT international application PCT/FR2022/050026, filed on Jan. 5, 2022, which claims priority from French Patent Application No. 21 00258, filed on Jan. 12, 2021, both which are incorporated herein by reference in their entirety.

TECHNICAL FIELD

The present invention relates to the field of propulsion assemblies for aircraft. It relates more specifically to propulsion assemblies comprising a nacelle of reduced length, referred to as "short nacelle", such as that described in the document EP 2 628 919 A1.

PRIOR ART

In a propulsion assembly comprising a dual-flow turbine engine, a primary gas flow path is provided, as well as a secondary gas flow path defined radially outwardly by an aerodynamic outer shroud acting as a nacelle. The turbine engine generally comprises a fan drawing in an air mass which is subsequently split into a primary flow circulating in the primary flow path, and into a secondary flow circulating in the secondary flow path. The primary flow typically passes through one or more compressors, for example a low-pressure compressor and a high-pressure compressor, a combustion chamber, one or more turbines, for example a high-pressure turbine and a low-pressure turbine, then finally a gas exhaust nozzle. In a known manner, the high-pressure turbine rotates the high-pressure compressor via a first shaft, referred to as high-pressure shaft, whereas the low-pressure turbine rotates the low-pressure compressor and the fan via a second shaft, referred to as low-pressure shaft. In order to improve the propulsive efficiency of the turbine engine and reduce the specific consumption thereof as well as the noise emitted by the fan, turbojet engines having an increased bypass ratio (corresponding to the ratio between the secondary (cold) flow rate, and the primary (hot) flow rate passing through the primary body) have been proposed.

To achieve such bypass ratios, the fan is uncoupled from the low-pressure turbine, thus making it possible to optimise the respective rotation speeds thereof independently. Usually, uncoupling is performed using a reduction gear such as an epicyclic gear mechanism, placed between the upstream end of the low-pressure shaft and the fan. The fan is then driven indirectly by the low-pressure shaft, via the gear mechanism and an additional shaft, referred to as fan shaft, which is fastened between the gear mechanism and the fan hub. This uncoupling thus makes it possible to reduce the rotation speed and the fan pressure ratio, and increase the power extracted by the low-pressure turbine. Thanks to the gear mechanism, the low-pressure shaft can thus run at higher rotation speeds than conventional turbojet engines.

Also in conventional embodiments, the turbine engine is equipped, downstream from the fan, with an annular row of stator vanes (also referred to as outlet guide vanes, or OGV vanes). These stator vanes are located in the cold part of the turbine engine, in the secondary flow path. They are essentially intended to straighten the cold air flow from the fan vanes.

In short-nacelle propulsion assembly configurations, the mounting pylon of the turbine engine may be required to partially enter the secondary flow path, downstream from the stator vanes, hence generating aerodynamic losses by friction, with a negative impact on the overall efficiency of this propulsion assembly.

DESCRIPTION OF THE INVENTION

To address the drawback mentioned above, in relation to the embodiments of the prior art, the invention firstly relates to a propulsion assembly for an aircraft comprising a dual-flow turbine engine equipped with a fan, an aerodynamic outer shroud acting as a nacelle arranged around the fan, as well as a mounting pylon for fastening the turbine engine to a wing element of the aircraft, the propulsion assembly having a primary gas flow path, as well as a secondary gas flow path defined by an inner radial defining surface as well by an outer radial defining surface formed by the aerodynamic outer shroud, the turbine engine further including an annular row of stator vanes arranged in the secondary flow path downstream from the fan, each stator vane extending through the secondary flow path while having a tip end connected to the aerodynamic outer shroud, as well as a root end connected to the inner radial defining surface of the secondary flow path, the mounting pylon comprising a part housed in the secondary flow path, referred to as upstream part, as well as a downstream part arranged downstream from a trailing edge of the aerodynamic outer shroud, in turn intended to be arranged entirely upstream from a leading edge of the wing element.

According to the invention, the upstream part of the mounting pylon housed in the secondary flow path extends radially from the inner radial defining surface, along a radial pylon height strictly less than a total radial height of the secondary flow path, and furthermore, the upstream part of the mounting pylon extends in the downstream direction from a root part of one of the stator vanes.

The invention thus provides a mounting pylon which only extends along a part of the radial height of the secondary flow path wherein it enters, in order to advantageously limit aerodynamic losses by friction in the same secondary flow path. As an additional measure to the above, the invention provides the integration of the root part of one of the stator vanes with the upstream part of this mounting pylon, in order to form an aerodynamic continuity between these two parts, in the axial direction. Such an integration makes it possible to minimise the aerodynamic losses even further, and also reduce transversal static pressure heterogeneities (distortion), rising from the downstream direction to the fan.

The combination of these measures makes it possible overall to improve the propulsive efficiency of the turbine engine.

Preferably, the invention provides at least any one of the following optional features, considered separately or in combination.

Preferably, the radial pylon height represents locally for example 20 to 70% of the total radial height of the secondary flow path, and more particularly 30 to 60% of the total radial height of the secondary flow path. This percentage can obviously vary along the upstream part of the pylon, and therefore not remain constant.

Preferably, the stator vane integrated in the mounting pylon includes, radially outwards from the upstream part of this pylon, a free trailing edge extending to the aerodynamic outer shroud. This free trailing edge thus extends radially along a part of the height of the secondary flow path complementary with the radial height of the pylon.

Preferably, the vane integrated in the mounting pylon includes the following parts, in radial succession from the inside outwards:

the root part integrated in the upstream part of the mounting pylon;

a transition part; and a tip part.

According to a preferred embodiment of the invention, the trailing edge of the transition part has a transverse thickness which increases moving radially towards the root part of the integrated vane. This makes it possible to obtain a smooth transition between the usually thin thickness of the tip part of the integrated stator vane, and the much more substantial thickness of the imaginary trailing edge of the root part of this vane, this trailing edge merging in the front end of the mounting pylon.

Alternatively, an abrupt break in thickness could be provided in the radial direction, between the root part of the integrated vane and the transition part thereof, the thickness of which could then be identical or similar to that of the tip part of the vane. According to a second preferred embodiment of the invention, the transition part has a chord of greater length than that of the tip part. By increasing the length of the chord locally, it is possible to retain a thin trailing edge limiting base losses, while providing a more substantial thickness upstream from this trailing edge, at the position where it is radially connected with the thick imaginary trailing edge of the root part of this vane. This makes it possible advantageously to limit the thickness differential between the root part and the transition part of the integrated vane, and therefore soften the connection resulting in gains in terms of aerodynamic performance.

According to a third preferred embodiment of the invention, said transition part comprises a truncated trailing edge such that the chord of the transition part has an increasing length from the root part towards the tip part. Here again, the proposed solution makes it possible to soften the connection between the root part and the transition part of the integrated vane, since this connection is made at the position where the respective thicknesses are most similar, i.e. fully or partially upstream from the thick imaginary trailing edge of the root part of this vane. The radial thickness transition proves to be advantageously softer, with here also gains in terms of aerodynamic performance. Preferably, the ratio between the total axial length of the aerodynamic outer shroud, and the diameter of the fan, is less than 1.25. This ratio illustrates a so-called "short" nacelle design, generally associated with the fact that it does not integrate a thrust reversal system. In such a short nacelle, intended to be located axially facing and upstream from the leading edge of the wing element, the thrust reversal system is integrated in the fan which has for this purpose variable pitch rotary fans. This architecture wherein the thrust reversal function is fulfilled by the fan is known as "VPF (Variable Pitch Fan) architecture". The invention also relates to an aircraft part comprising such a propulsion assembly, as well as a wing element, the aerodynamic outer shroud acting as the nacelle extending entirely upstream from a leading edge of the wing element.

Preferably, an upper part of the shroud is located arranged axially facing the leading edge of the wing, and an apex of the outside of the aerodynamic outer shroud extends higher than the wing element considered in line with the connection of the mounting pylon with said wing element.

Finally, the invention also relates to an aircraft including at least one such part, and preferably two parts respectively integrating the two wings of the aircraft.

Other advantages and features of the invention will appear in the non-limiting detailed description hereinbelow.

BRIEF DESCRIPTION OF THE DRAWINGS

This description will be given with reference to the appended drawings, wherein.

DETAILED DESCRIPTION OF PREFERRED EMBODIMENTS

Figure 1:
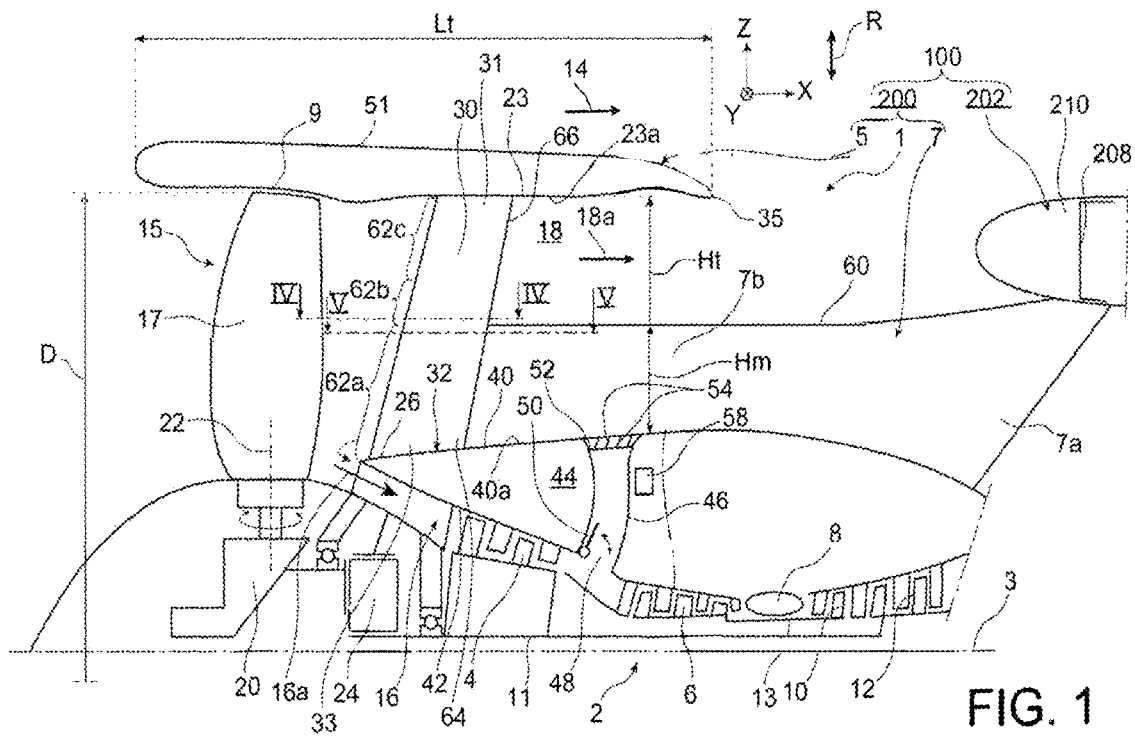
FIG. 1 represents a schematic longitudinal half-sectional view of a propulsion assembly according to a first preferred embodiment of the invention, the cutting plane passing through the 12 and 6 o'clock positions of the turbojet engine fitted in this propulsion assembly.
Figure 2:
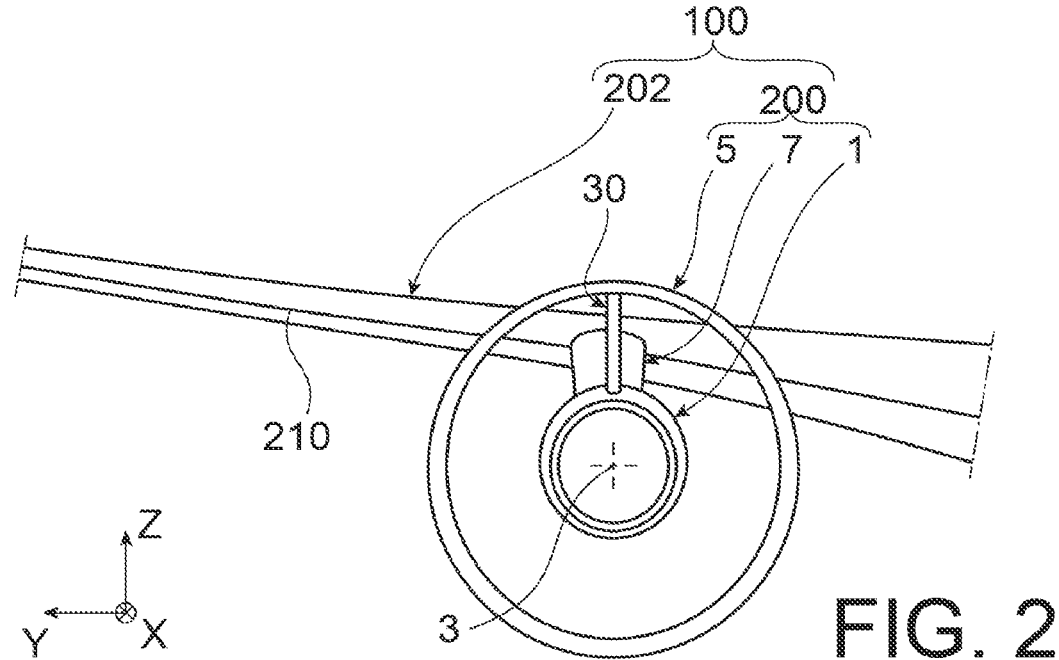
FIG. 2 represents a front view of the propulsion assembly shown in FIG. 1, the stator vanes having been removed from the secondary flow path for more clarity, with the exception of one which is integrated in the pylon, the fan vanes having also been removed.

With reference to FIGS. 1 and 2, a part 100 of an aircraft is shown, comprising a propulsion assembly 200 as well as a wing element 202, here an aircraft wing. Preferably, two parts 100 are arranged laterally on either side of the fuselage 204 of the aircraft 300 shown in FIG. 3 (only one of the two propulsion assemblies 200 being represented in this FIG. 3).

The propulsion assembly 200 includes a dual-flow and dual-body turbojet engine 1, an aerodynamic outer shroud 5 acting as a nacelle, as well as a mounting pylon 7 for mounting the turbojet engine 1 on the wing 202. In the figures, the mounting pylon 7 is only represented with the outer contour thereof formed by one or more aerodynamic fairings. Inside these fairings, a so-called primary structure (not shown) is conventionally provided, for transferring the loads between the turbojet engine 1 and the wing 202. More specifically, the primary structure of the pylon is generally fastened to a front wing spar 208. In addition to containing the primary structure, the fairings of the mounting pylon 7 integrate a number of conventional elements connecting the engine to the aircraft, such as ducts, heat exchangers, electric cables, mechanical drive shafts, structural parts of the engine suspension system, etc.

Figures 3, 4:
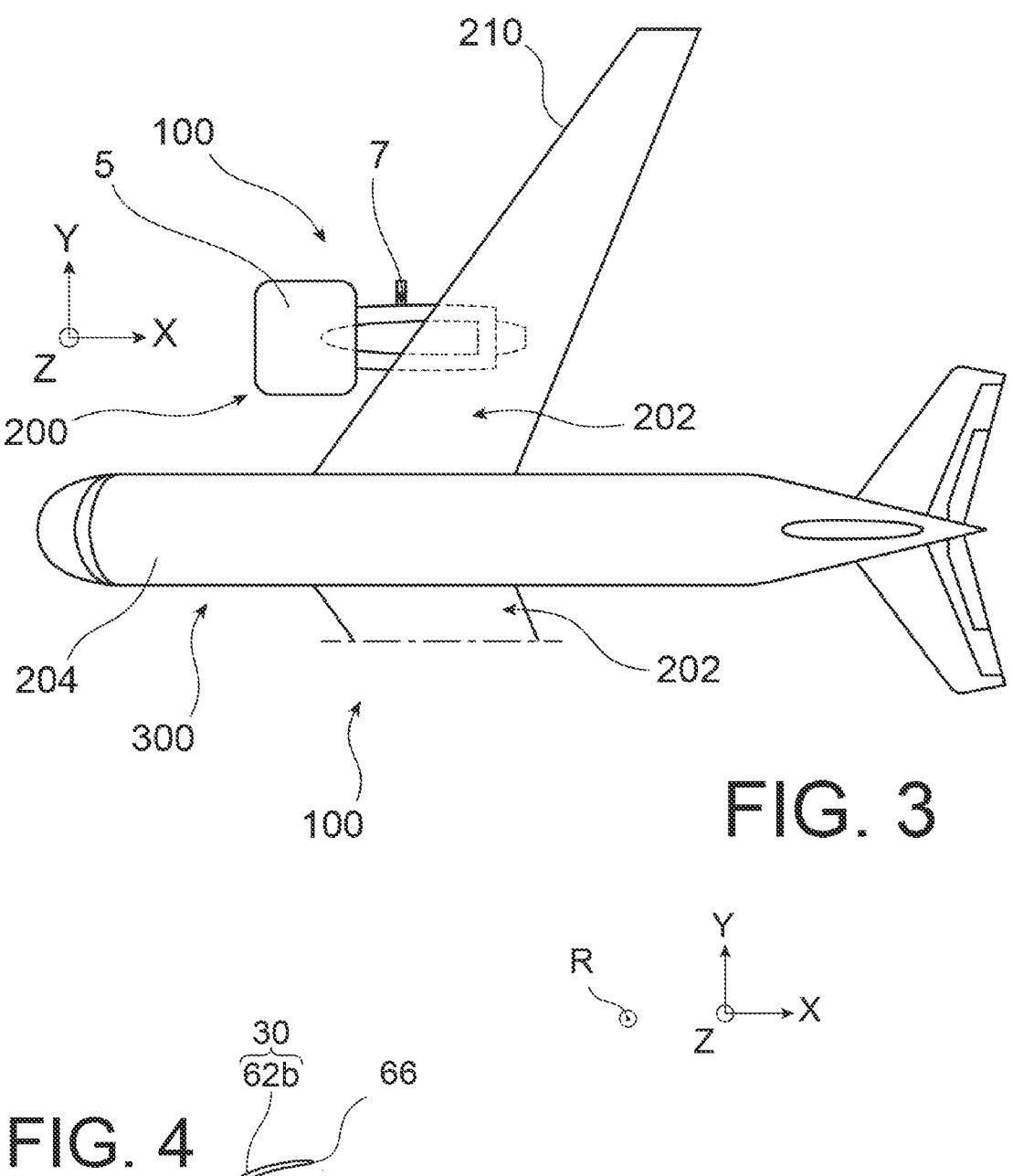
FIG. 3 is a top view of the aircraft equipped with the propulsion assembly shown in the previous figures.
FIG. 4 represents a sectional view along the line IV-IV in FIG. 1, the line IV-IV being parallel or substantially parallel with the central longitudinal axis of the turbojet engine, and passing through a radially inner end portion of a transition part of the integrated vane.
Figure 5:
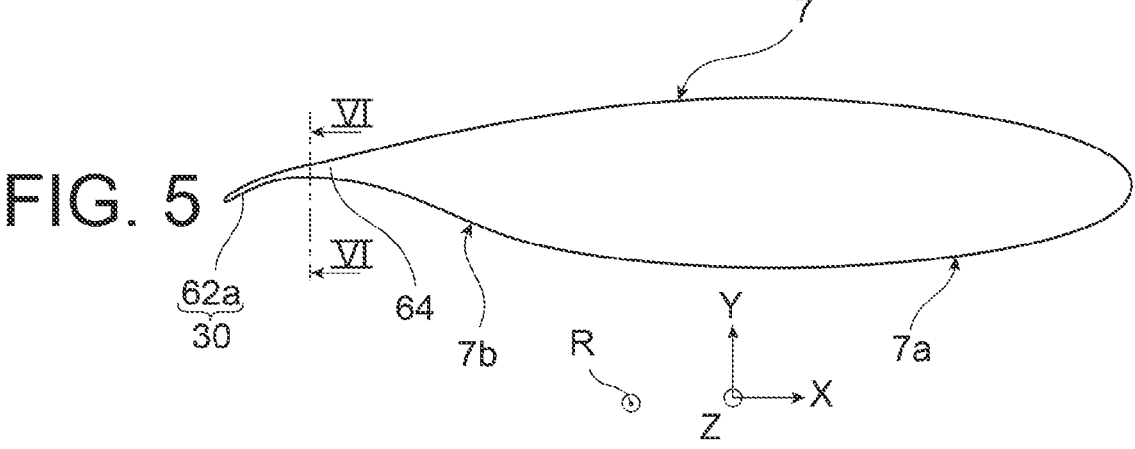
FIG. 5 represents a sectional view along the line V-V in FIG. 1, the line V-V being parallel or substantially parallel with the central longitudinal axis of the turbojet engine, and passing through a radially outer end portion of a root part of the integrated vane.

The dual-flow and dual-body turbojet engine 1 has a high bypass ratio, for example greater than 15. Consequently, the outer diameter thereof is high, and for this reason, it is arranged in a substantially raised position in relation to the wing 202 carrying it, so as to retain a sufficient ground clearance despite the large diameter. As seen in FIGS. 1 to 3, the outer shroud acting as a nacelle 5 is located entirely upstream in relation to a leading edge 210 of the wing 202. In this regard, it is noted that the terms "upstream" and "downstream" are considered along a main direction 14 of gas flow inside the turbojet engine, when the latter is in the normal propulsion configuration. The terms "front" and "rear" are used in relation to a direction opposite the main gas flow direction 14.

An upper part 51 of the shroud 5 is arranged axially facing the leading edge 210 of the wing 202, which conveys the raised nature of the short-nacelle propulsion assembly 200. Furthermore, an apex of the outside of the aerodynamic outer shroud 5 extends higher than the wing element 202 considered in line with the connection of the mounting pylon 7 with said wing element.

The turbojet engine 1 conventionally includes a gas generator 2 on either side of which are arranged a low-pressure compressor 4 and a low-pressure turbine 12, this gas generator 2 comprising a high-pressure compressor 6, a combustion chamber 8 and a high-pressure turbine 10. The low-pressure compressor 4 and the low-pressure turbine 12 form a low-pressure body, and are connected to one another by a low-pressure shaft 11 centred on a longitudinal axis 3 of the turbojet engine. Similarly, the high-pressure compressor 6 and the high-pressure turbine 10 form a high-pressure body, and are connected to one another by a high-pressure shaft 13 also centred on the axis 3 and arranged about the low-pressure shaft 11.

The turbojet engine 1 further includes, upstream from the gas generator 2 and the low-pressure compressor 4, a single fan 15 which is here arranged directly behind an air inlet cone of the engine. The fan 15 includes a ring of rotary fan vanes 17 about the axis 3, this ring being surrounded by a fan casing 9. The fan vanes 17 are variable-pitch, i.e. the incidence thereof can be controlled by a control mechanism 20 arranged at least partially in the inlet cone, and designed to pivot these vanes 17 about the respective longitudinal axes 22 thereof. This control mechanism 20, of known mechanical, electrical, hydraulic, and/or pneumatic type design, is itself controlled by an electronic control unit (not shown), which makes it possible to order the value of the pitch angles of the vanes 17 according to the needs encountered, particularly to perform the thrust reversal function. As mentioned above, reference is made here to a propulsion assembly 200 wherein the thrust reversal function are actually integrated in the fan 15, and not in the outer shroud acting as a nacelle 5, as is more commonly encountered. This shroud 5 can consequently have a short length compared to the diameter of the fan 15. Preferably, the ratio between the total axial length "Lt" of the shroud 5, and the diameter "D" of the fan 15, is less than 1.25.

Hereinafter in the description of the propulsion assembly 200, reference is made to the longitudinal direction X parallel with the axis 3 of the turbojet engine, and also known as axial direction, to the transverse direction Y also known as lateral direction, and finally to the vertical direction Z also known as the height direction, these three directions X, Y and Z being mutually orthogonal. Reference is also made to the radial direction R, to be taken into consideration in relation to the axis 3.

The VPF type fan 15, is not driven directly by the low-pressure shaft 11, but merely driven indirectly by this shaft, via a gear mechanism 24, which makes it possible to rotate with a slower speed. Nevertheless, a direct drive solution of the fan 15, by the low-pressure shaft 11, falls within the scope of the invention.

Furthermore, the turbojet engine 1 defines a primary gas flow path 16, intended to be flowed through by a primary flow 16a, as well as a secondary gas flow path 18, intended to be flowed through by a secondary flow 18a located radially outwardly from the primary flow. The flow of the fan 15 is thus split at a flow separation nozzle 26.

As known to a person skilled in the art, the secondary flow path 18 is defined radially outwardly partially by an outer shell 23, integrated in the shroud 5. The shroud 23 is preferably metallic, and extends to the rear of the fan casing 9. More specifically, the shroud 23 has internally a radial outer defining surface 23a of the secondary flow path 18. The shroud can alternatively be composite-based having carbon fibres, like known fan module casings.

In the radial direction R between the two flow paths 16, 18, an inter-flow path compartment 44 is provided, wherein several items of equipment/utilities 58 are arranged. This compartment 44 is formed partially by an outer shell 40, having externally a radial inner defining surface 40a of the secondary flow path 18.

Downstream from the fan 15, in the secondary flow path 18, an annular row of stator vanes 30 centred on the axis 3 is provided, these stator vanes 30 also being referred to as OGV vanes or outlet guide vanes.

Only one of these vanes 30 is visible in FIG. 1, that specific to the invention. Nevertheless, it is noted that conventionally, each of the vanes 30 of the annular row passes through the entire secondary flow path 18 along the direction R, even if a slight inclination of these vanes 30 in the direction X is possible, as shown in the FIG. 1. Each stator vane 30 thus has a tip end 31 connected to the outer shell 23 of the shroud 5 acting as a nacelle, in the same way as it includes a root end 33 connected to the radial inner defining surface 40a of the secondary flow path 18. More specifically, this connection of the root end 33 is preferably performed at an upstream part of the surface 40*a* defined by the outer shell 40 of the inter-flow path compartment 44, at which an intermediate casing hub 32 is formed.

In a known manner, these stator vanes 30 are spaced circumferentially apart from each other, and make it possible to rectify the secondary flow after it flows through the fan 15. In addition, these vanes 30 can also fulfil a structural function, by transferring the loads from the reduction gear 24 and the bearings of the motor shafts and the fan hub, to the outer shell 23. In other words, the entity 32 forms the hub of an intermediate casing, and the latter is supplemented by radial arms formed by the stator vanes 30, and also supplemented by the outer shell 23 whereon the tip ends 31 of these vanes 30 are fastened.

The inter-flow path compartment 44 is also defined by the inner shell 42, configured to outwardly define the primary gas flow path 16. The two shells 40, 42 extend in the downstream direction from the separation nozzle 26, which connects them. Downstream from the stator guide vanes 30, a plurality of air discharge ducts 46, distributed about the axis 3, is provided. Each discharge duct 46 extends globally radially, optionally with an axial component extending in the downstream direction, from the inner shell 42 to the outer shell 40, so as to be able to connect the primary flow path 16 with the secondary flow path 18. Each air discharge duct 46 opens into the primary flow path 16 through an inlet orifice 48 equipped with a VBV discharge valve 50, the inlet orifice 48 being arranged axially between the low-pressure compressor 4 and the high-pressure compressor 6. Similarly, each air discharge duct 46 opens into the secondary flow path 18, through an outlet orifice 52 equipped with discharge fins 54.

The mounting pylon 7 extends along a limited height along the radial direction R, also corresponding to the vertical direction Z in the area where this pylon is located. Indeed, the pylon 7 is conventionally arranged in a 12 o'clock position, extending lengthwise in the upstream direction along the direction X, from a lower portion of the wing 202, close to the front wing spar 208 and the leading edge 210 of the wing 202.

The mounting pylon 7 includes a downstream part 7*a* which extends to the front from the wing 202, connecting along the outer shell 40, along a substantial length thereof. This downstream part 7*a* extends along the direction X up to close to a trailing edge 35 of the shroud 5 acting as a nacelle. From this trailing edge 35, the pylon is extended continuously by an upstream part 7*b* which is entirely located housed in the secondary flow path 18, once again while remaining connected along the entirety thereof on the outer shell 40 of the inter-flow path compartment 44. Thus, the pylon 7 is closed radially inward by the outer shell 40, which it moulds continuously along an axial length extended along the direction X, capable of going from the low-pressure compressor 4 or beyond in the upstream direction, to the low-pressure turbine 12, or beyond in the downstream direction.

One of the specificities of the invention therefore lies in the reduced height of the upstream part 7*b* of the pylon 7, along the radial direction R also corresponding here to the vertical direction Z. By reduced or partial height, it is understood that the upstream part 7*b* extends radially from the surface 40*a* along a radial pylon height "Hm", strictly less than a total radial height "Ht" of the secondary flow path 18. All along this upstream part 7*b* of the pylon, it is therefore never in contact with the outer radial defining surface 23*a* of the secondary flow path 18. Preferably, the radial pylon height Hm locally represents 30 to 60% of the total radial height Ht of the secondary flow path 18. More generally, the radial pylon height Hm locally represents 20 to 70% of the total radial height of the secondary flow path. This percentage is not necessarily identical all along the upstream pylon part 7*b*, but it can on the other hand vary locally, once again while remaining preferably within the range of values mentioned above. This percentage variation can be explained by a relatively variable radial pylon height Hm along the upstream part 7*b*, whereas the total radial flow path height Ht remains substantially constant, or relatively invariable. In this regard, it is noted that the crest line 60 of the pylon 7 is straight or substantially straight, preferably parallel or substantially parallel with the direction X. The radial height of the pylon can be approximately 50% of the total radial height Ht of the secondary flow path in the vicinity of the trailing edge 66 of the integrated vane 30. Furthermore, it can be of increasing height, for example with continually variable curvature in the downstream direction.

A second specificity of the invention lies in the integration of one of the stator vanes 30 in the upstream pylon part 7*b*. Indeed, it consists of the vane 30 located in the same hour position as that of the pylon 7, and arranged axially upstream therefrom. Instead of having a material discontinuity between the trailing edge of this vane 30, and the front end of the pylon 7, it is therefore provided to integrate them into each other, thus giving rise to axial material continuity between these two entities within the secondary flow path 18. For this purpose, the integrated stator vane 30 includes the following parts, in radial succession from the inside outwards. It consists firstly of a root part 62*a* integrated axially in the upstream pylon part 7*b*, this root part 62*a* including the root end 33 connected to the defining surface 40*a*. Then, the integrated vane 30 includes a transition part 62*b*, then a tip part 62*c* ending with the tip end 31 connected to the defining surface 23*a*.

Thus, the specificity of this integrated vane 30 lies firstly in the root part 62*a* from which the upstream pylon part 7*b* extends axially in the downstream direction. In other words, the root part 62*a* has an imaginary trailing edge 64 which merges in the front end of the upstream pylon part 7*b*, since no material discontinuity is observed between these two entities, along the direction X. At the lower surface and the upper surface of this integrated assembly 62*a*, 7*b*, the material continuity is produced either by a one-piece aerodynamic wall, i.e. made of a single piece, or by the association of several walls having an acceptable aerodynamic junction, for example by swaged overlay, or any other technique known in this field.

On the other hand, the integrated vane 30 has, radially outwards from the upstream pylon part 7*b*, i.e. radially outwards from the root part 62*a*, a free trailing edge 66 extending to the defining surface 23*a*. The free trailing edge 66 thus corresponds to the trailing edge of the transition part 62*b* and the tip part 62*c* together. The imaginary trailing edge 64 of the root part 62*a* extends along the radial height Hm, whereas the free trailing edge 66 extends along a height corresponding to the differential between the heights Ht and Hm.

Figure 6:
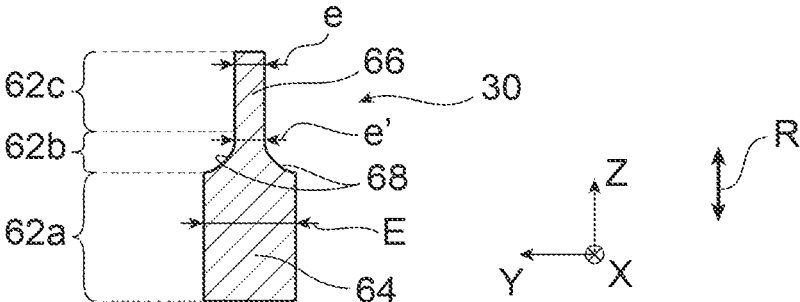
FIG. 6 represents a sectional view along the line VI-VI in FIG. 5.
Figure 7:
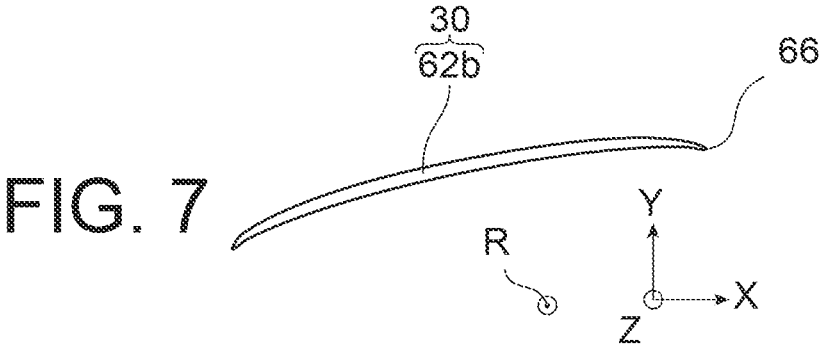
FIG. 7 is a sectional view similar to that of FIG. 4, with the integrated vane in the form of an alternative embodiment.
Figure 8:
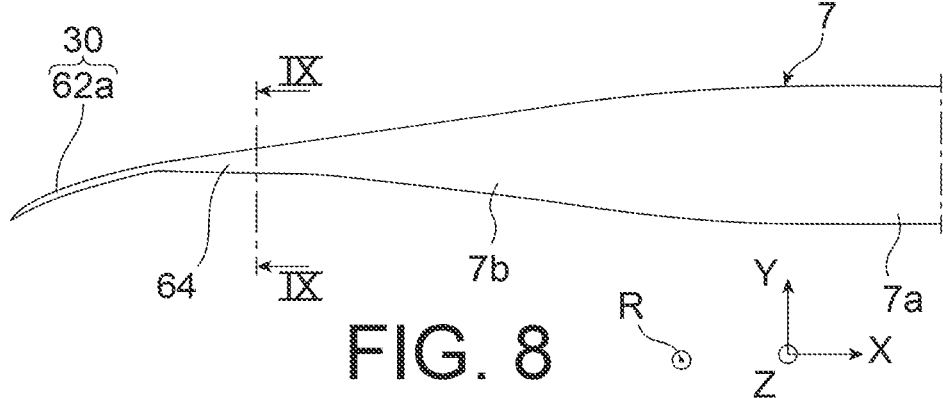
FIG. 8 is a sectional view similar to that of FIG. 5, with the integrated vane in the form of the alternative embodiment shown in the preceding figure.
Figure 9:
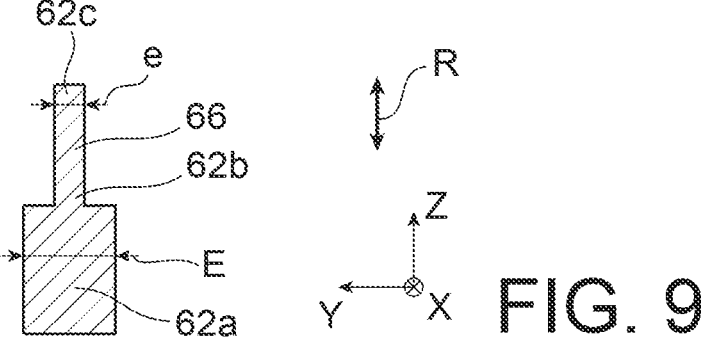
FIG. 9 represents a sectional view along the line IX-IX in FIG. 8.

In the first preferred embodiment shown in FIGS. 1 and 4 to 6, the imaginary trailing edge 64 of the root part 62*a* is represented with a substantial thickness along the direction Y, this thickness "E" referenced in FIG. 6 increasing in the downstream direction towards the upstream pylon part 7*b*. This transverse/lateral thickness E of the imaginary trailing edge 64 is substantially greater than that of the trailing edge 66 of the transition part 62*b* and the tip part 62*c*. Indeed, the free trailing edge 66 of the tip part 62c has a particularly thin conventional thickness "e", whereas the trailing edge 66 of the transition part 62b has a variable transverse thickness "e'", which increases radially inwards progressively from the value "e" to the value "E". For this purpose, two connection radii 68 can be respectively provided on the lower surface side and the upper surface side of the transition part 62b, as seen more clearly in FIG. 6. This makes it possible to obtain a soft transition between the substantially different thicknesses E,e of the parts 62a, 62c, to limit the aerodynamic losses observed at this break in thickness. According to an alternative shown in FIGS. 7 to 9, the transition zone 62b has a profile identical or similar to that of the tip part 62c, involving a reduced thickness "e" for the free trailing edge 66 thereof, identical or similar to the thickness of the trailing edge of the tip part 62c. This results in an abrupt break in thickness between the root part 62a and the transition part 62b, as seen more clearly in FIG. 9.

Figure 10:
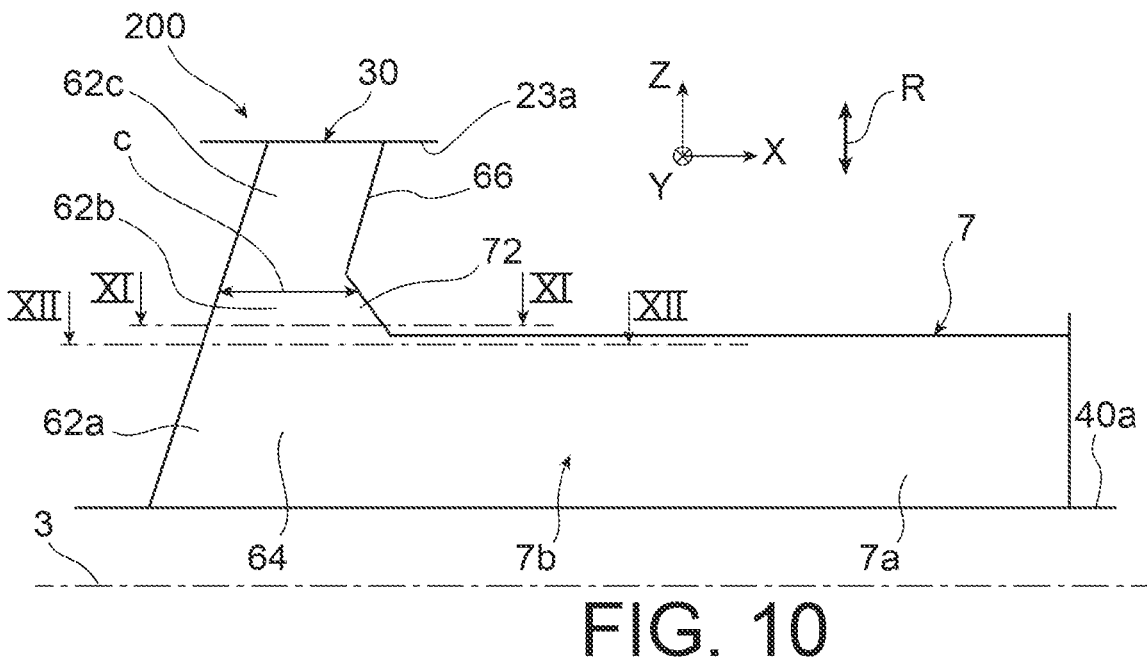
FIG. 10 represents a sectional view similar to that of FIG. 1, with less detail, and showing the propulsion assembly according to a second preferred embodiment of the invention.
Figure 11:
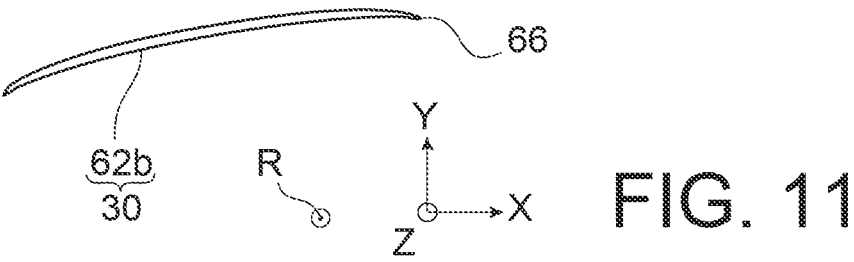
FIG. 11 represents a sectional view along the line XI-XI in FIG. 10, the line XI-XI being parallel or substantially parallel with the central longitudinal axis of the turbojet engine, and passing through a radially inner end portion of a transition part of the integrated vane.
Figure 12:
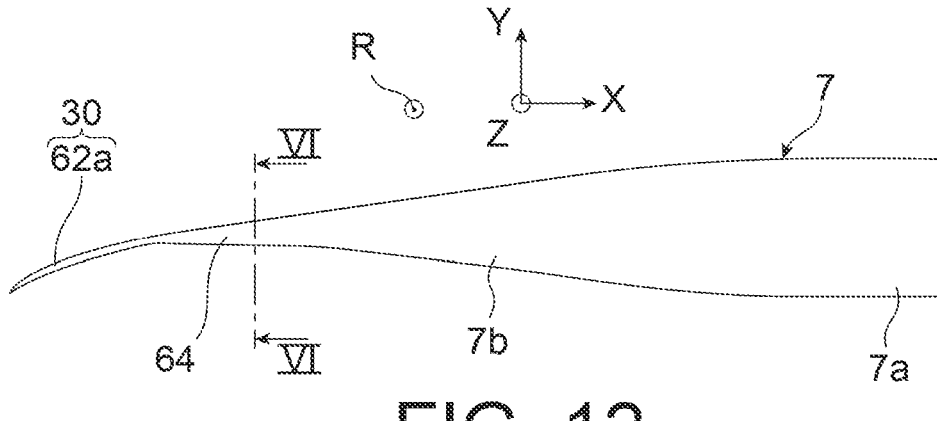
FIG. 12 represents a sectional view along the line XII-XII in FIG. 10, the line XII-XII being parallel or substantially parallel with the central longitudinal axis of the turbojet engine, and passing through a radially outer end portion of a root part of the integrated vane.

According to a second preferred embodiment represented in FIGS. 10 to 12, the transition part 62b has a chord "C" of greater length than that of the tip part 62c. For this purpose, the transition part 62b is equipped with a trailing edge extension 72, for example of general triangular shape and arranged in such a way that the chord C has an increasing axial length moving radially from the inside outwards, i.e. from the tip part 62c to the root part 62a. The trailing edge extension 72 preferably has a transverse thickness decreasing continually in the downstream direction, up to the free trailing edge 66 of the transition part 62b. A reduction in thickness is also observed on moving radially outwards, closer to the free trailing edge 66.

By thus increasing the length of the chord C locally in the transition part 62b, it is possible to retain a thin free trailing edge 66 limiting base losses, while providing a more substantial thickness upstream from this trailing edge 66, at the position where it is radially connected with the thick imaginary trailing edge 64 of the root part 62a. This makes it possible advantageously to limit the transverse thickness differential between the part 62a, 62b, and therefore soften the radial connection, resulting in gains in terms of aerodynamic performance.

Figure 13:
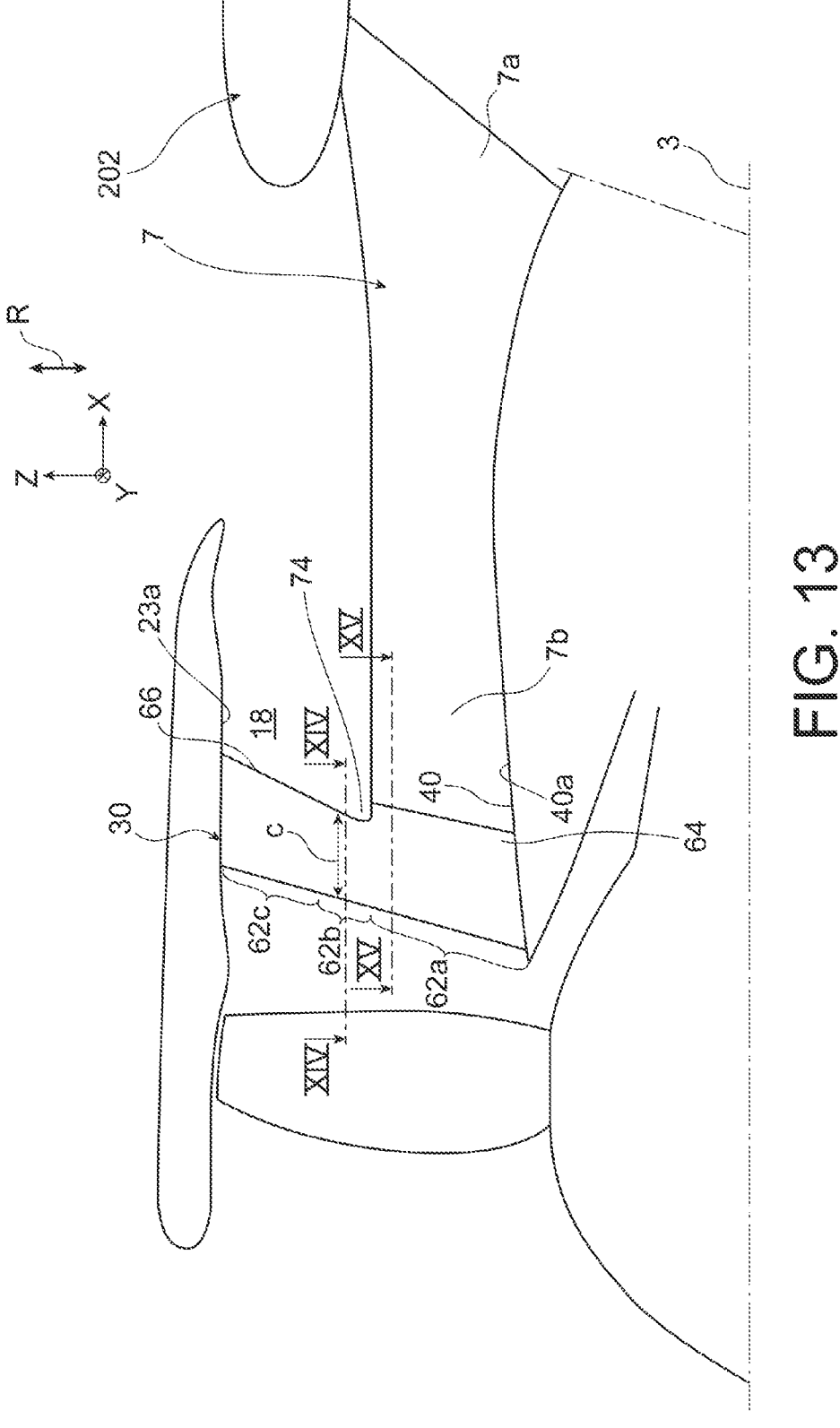
FIG. 13 represents a sectional view similar to that of FIG. 1, with less detail, and showing the propulsion assembly according to a third preferred embodiment of the invention.
Figure 14:
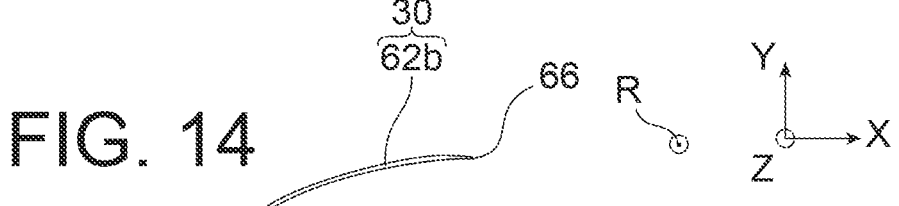
FIG. 14 represents a sectional view along the line XIV-XIV in FIG. 13, the line XIV-XIV being parallel or substantially parallel with the central longitudinal axis of the turbojet engine, and passing through a radially inner end portion of a transition part of the integrated vane.
Figure 15:
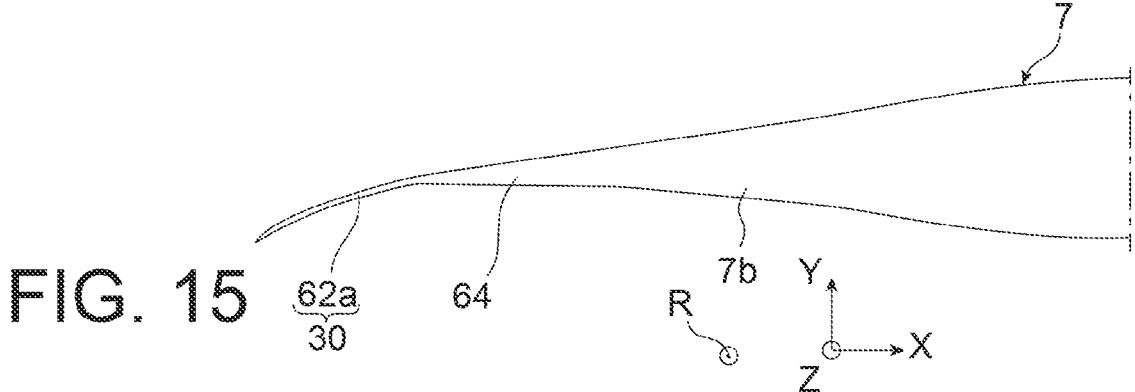
FIG. 15 represents a sectional view along the line XV-XV in FIG. 13, the line XV-XV being parallel or substantially parallel with the central longitudinal axis of the turbojet engine, and passing through a radially outer end portion of a root part of the integrated vane.

According to a third preferred embodiment shown in FIGS. 13 to 15, the transition part 62b comprises a truncated free trailing edge 66, for example so as to form a notch 74 opening axially in the downstream direction. This notch 74 in the trailing edge 66 is preferably of general triangular shape. It can extend up to into the tip part 62c, as seen in FIG. 13. The shape selected for the notch 74 can be such that the free trailing edge 66 of the two successive parts 62b, 62c is substantially straight, while being inclined along the direction X as also seen in FIG. 13, since the radially outer end thereof is located more downstream than the radially inner end thereof.

The notch 74 is embodied so as to truncate a downstream portion of the transition part 62b, such that the chord "C" of this part 62b has an increasing axial length moving radially from the inside outwards, i.e. moving from the root part 62b to the tip part 62c. In other words, the chord length increases on moving closer to the tip part 62c, until a conventional chord length identical or substantially identical to that of the other vanes 30 of the annular row is obtained.

This third preferred embodiment also provides a solution making it possible to soften the radial connection between the parts 62a, 62b, since it is performed at the position where the respective transverse thicknesses are the most similar, i.e. fully or partially upstream from the thick imaginary trailing edge 64 of the root part 62a, as shown clearly by the alignment of FIGS. 14 and 15. With such a configuration, the radial thickness transition proves to be advantageously softer, with here also gains in terms of aerodynamic performance.

Of course, various modifications may be made by the person skilled in the art to the invention as described, by way of non-limiting examples only, the scope of which is defined by the appended claims. In particular, the different preferred embodiments described above can be combined with each other.

The invention claimed is:

1. A propulsion assembly for an aircraft comprising a dual-flow turbine engine comprising a fan; an aerodynamic outer shroud acting as a nacelle arranged around the fan; a mounting pylon for fastening the turbine engine to a wing element of the aircraft, the propulsion assembly having a primary gas flow path; and a secondary gas flow path defined by an inner radial defining surface as well by an outer radial defining surface formed by the aerodynamic outer shroud, the turbine engine further including an annular row of stator vanes arranged in the secondary flow path downstream from the fan, each stator vane extending through the secondary flow path while having a tip end connected to the aerodynamic outer shroud and a root end connected to the inner radial defining surface of the secondary flow path, the mounting pylon comprising an upstream part housed in the secondary flow path and a downstream part arranged downstream from a trailing edge of the aerodynamic outer shroud, the trailing edge of the aerodynamic outer shroud is arranged entirely upstream from a leading edge of the wing element, wherein the upstream part of the mounting pylon housed in the secondary flow path extends radially from the inner radial defining surface, along a radial pylon height strictly less than a total radial height of the secondary flow path, and in that the upstream part of the mounting pylon extends in the downstream direction from a root part of one of the stator vanes, wherein the upstream part of the mounting pylon is radially surrounded by the secondary flow path and the downstream part of the mounting pylon is not surrounded by the secondary flow path, and wherein the one stator vane includes, radially outwards from the upstream part of the mounting pylon, a free trailing edge of the stator vane extending to the aerodynamic outer shroud.

2. The propulsion assembly according to claim 1, wherein the radial pylon height locally represents 20 to 70% of the total radial height of the secondary flow path.

3. The propulsion assembly according to claim 1, wherein the one stator vane includes the following parts, in radial succession from the inside outwards:

the root part integrated in the upstream part of the mounting pylon;

a transition part; and a tip part.

4. The propulsion assembly according to claim 3, wherein a trailing edge of the transition part has a transverse thickness which increases moving radially towards the root part of the one stator vane.

5. The propulsion assembly according to claim 3, wherein the transition part has a chord of greater length than that of the tip part or wherein said transition part comprises a truncated trailing edge such that the chord of the transition part has an increasing length moving from the root part to the tip part.

6. The propulsion assembly according to claim 1, wherein the ratio between the total axial length of the aerodynamic outer shroud and the diameter of the fan is less than 1.25.

7. The propulsion assembly according to claim 1, wherein the fan includes variable-pitch rotary vanes and wherein the aerodynamic outer shroud acting as a nacelle is devoid of a thrust reversal system.

8. An aircraft part comprising a propulsion assembly according to claim 1 and the wing element.

9. An aircraft comprising at least one part according to claim 8.

10. The propulsion assembly according to claim 1, wherein an upper part of the shroud is arranged axially upstream of the leading edge of the wing element and wherein an apex of the outside of the aerodynamic outer shroud extends higher than the wing element.

\* \* \* \* \*